(12) United States Patent
Mori et al.

(10) Patent No.: US 9,368,953 B2
(45) Date of Patent: Jun. 14, 2016

(54) TERMINAL-FORMED WIRE AND MANUFACTURING METHOD THEREOF

(71) Applicant: YAZAKI CORPORATION, Minato-ku, Tokyo (JP)

(72) Inventors: Shigeo Mori, Shizuoka (JP); Hayato Ilzuka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/426,788

(22) PCT Filed: Sep. 9, 2013

(86) PCT No.: PCT/JP2013/074188
§ 371 (c)(1),
(2) Date: Mar. 9, 2015

(87) PCT Pub. No.: WO2014/042108
PCT Pub. Date: Mar. 20, 2014

(65) Prior Publication Data
US 2015/0236494 A1    Aug. 20, 2015

(30) Foreign Application Priority Data
Sep. 14, 2012 (JP) .................................. 2012-202196

(51) Int. Cl.
*H01R 13/58* (2006.01)
*H02G 15/02* (2006.01)
*H02G 1/14* (2006.01)

(52) U.S. Cl.
CPC ................. *H02G 15/02* (2013.01); *H02G 1/14* (2013.01); *Y10T 29/49213* (2015.01)

(58) Field of Classification Search
CPC ........... H01R 13/5833; H01R 2103/00; H01R 13/5808; H01R 13/506; H01R 31/06
USPC .................................... 439/453–456, 459, 502
See application file for complete search history.

(56) References Cited

U.S. PATENT DOCUMENTS

| | | | | |
|---|---|---|---|---|
| 2,260,121 A | * | 10/1941 | Miller | .................. H01R 25/003 174/145 |
| 2,367,996 A | * | 1/1945 | Clark | ..................... H01B 17/58 439/447 |

(Continued)

FOREIGN PATENT DOCUMENTS

| | | |
|---|---|---|
| DE | 419005 C | 9/1925 |
| DE | 102007045512 A1 | 4/2009 |

(Continued)

OTHER PUBLICATIONS

Search Report issued on May 9, 2016 in the counterpart European application.

*Primary Examiner* — Thanh Tam Le
(74) *Attorney, Agent, or Firm* — Mots Law, PLLC

(57) ABSTRACT

A terminal-formed wire (1) includes a covered wire (7) obtained by covering an outer circumference of a core wire part (3) including a plurality of element wires with a covering part (5); and a terminal part (11) provided at a terminal of the covered wire (7) and terminal-formed with the core wire part (3) exposed from the covering part and with the core wire part (3) having a connection hole (9), wherein, at the terminal part (11), the plurality of element wires of the core wire part (3) are divided into two; and wherein leading ends of the divided plurality of the element wires (13), (15) are folded back toward a root part in different directions from each other to form the connection hole (9).

17 Claims, 2 Drawing Sheets

(56) References Cited

U.S. PATENT DOCUMENTS

| | | | |
|---|---|---|---|
| 2,508,638 A * | 5/1950 | Bricker | D06F 75/28 248/52 |
| 2,672,594 A * | 3/1954 | Morton | H01R 13/62 439/342 |
| 4,317,277 A * | 3/1982 | Bennett | B23K 11/163 174/94 R |
| 4,342,494 A | 8/1982 | Normann et al. | |
| 4,389,083 A | 6/1983 | Normann et al. | |
| 4,445,741 A * | 5/1984 | Annoot | H01R 25/003 439/284 |
| 5,151,050 A * | 9/1992 | Scholz | H01R 13/58 439/456 |
| 5,191,710 A | 3/1993 | Fujimaki et al. | |
| 5,425,657 A * | 6/1995 | Davis | H01R 9/031 439/405 |
| 5,935,474 A * | 8/1999 | Grischenkov | H01R 4/185 174/84 C |
| 7,048,551 B2 * | 5/2006 | Takayama | H01R 4/185 439/67 |
| 8,052,463 B2 * | 11/2011 | Hattori | B60R 16/0215 439/456 |

FOREIGN PATENT DOCUMENTS

| | | |
|---|---|---|
| EP | 1973200 A1 | 9/2008 |
| JP | S56-153669 A | 11/1981 |
| JP | S57-188273 A | 11/1982 |
| JP | H02-120711 A | 9/1990 |
| JP | H04-249875 A | 9/1992 |
| JP | H01-135610 U | 9/1998 |
| JP | 2000-348539 A | 12/2000 |

* cited by examiner

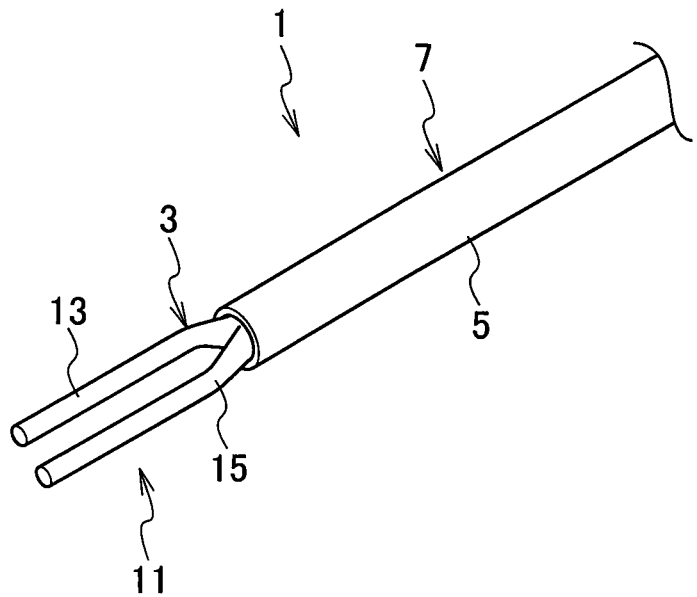
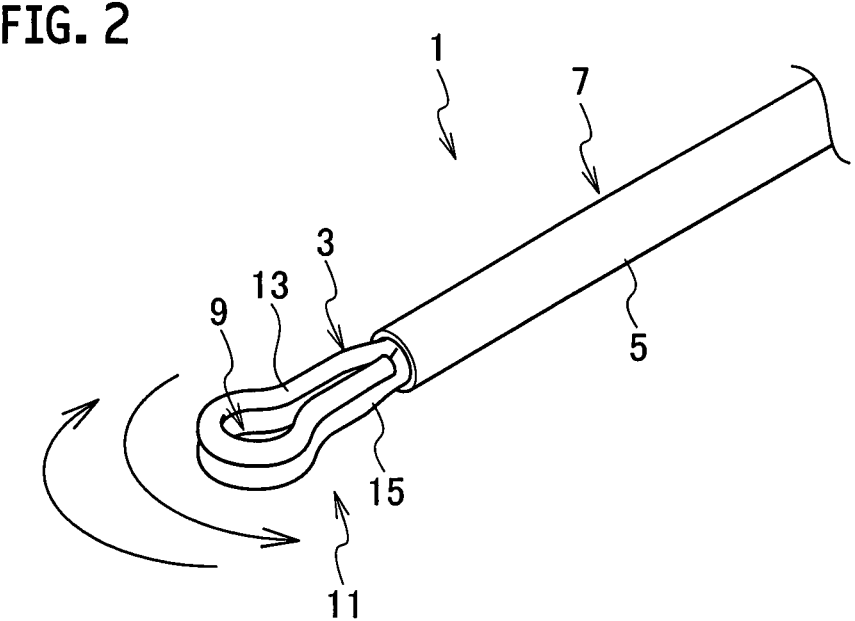

TERMINAL-FORMED WIRE AND MANUFACTURING METHOD THEREOF

TECHNICAL FIELD

The present invention relates to a terminal-formed wire and a manufacturing method thereof.

BACKGROUND ART

As a terminal-formed wire, a wire has been conventionally known which includes a covered wire obtained by covering an outer circumference of a core wire part including a plurality of element wires with a covering part; and a terminal part provided at a terminal of the covered wire and terminal-formed with the core wire part exposed from the covering part and with the core wire part having a connection hole (refer to Patent Literature 1).

In the terminal-formed wire, the plurality of the element wires in the core wire part are bundled into one, and leading ends of the bundled plurality of the element wires are folded back toward a root part to form the connection hole so as to form the terminal part.

As described above, by forming the terminal part by folding back the core wire part, when a bolt and so on is fastened into the connection hole of the terminal part, even if a tension force is applied to the terminal part in a length direction of the wire, the terminal part can be prevented from generating ripping or shearing.

CITATION LIST

Patent Literature

Patent Literature 1: Japanese Patent Laid-Open Publication No. H04-249875

SUMMARY OF INVENTION

Technical Problem

However, in the terminal-formed wire as described above in the Patent Literature 1, since the leading end part of the plurality of the element wires bundled into one is folded back toward the root part to form the terminal part, when a diameter of the core wire part becomes larger, a bending force of the root part of the core wire part becomes larger, which makes a process to be performed hard. In addition, even a bending process is performed, a reactive force of the core wire part is large, and thus it is hard to maintain a form of the wire before terminal formation.

To cope with the large bending force, it can be considered to increase a length of the core wire part exposed from the covering part. However, the longer the core wire part is, the longer the terminal part becomes, thus causing a problem in which a size of the terminal part becomes larger.

It is an object of the present invention to provide the terminal-formed wire capable of reducing the size of the terminal part, facilitating the bending process on the core wire part, and facilitating maintaining the form of the wire before terminal formation, and a manufacturing method thereof.

Solution To Problem

A terminal-formed wire of the present invention includes a covered wire obtained by covering an outer circumference of a core wire part including a plurality of element wires with a covering part; and a terminal part provided at a terminal of the covered wire and terminal-formed with the core wire part exposed from the covering part and with the core wire part having a connection hole, wherein, at the terminal part, the plurality of element wires of the core wire part is divided into two; and wherein leading ends of the divided plurality of the element wires are folded back toward a root part in different directions from each other to form the connection hole.

A manufacturing method of a terminal-formed wire includes a first process of removing a covering part of a terminal of a covered wire to expose a core wire part including a plurality of element wires; a second process of dividing the plurality of element wires of the core wire part into two; a third process of folding back leading edges of the divided plurality of element wires toward a root part in different directions from each other to form a connection hole; and a fourth process of forming a terminal part by solidifying the core wire part formed with the connection hole.

BRIEF DESCRIPTION OF DRAWINGS

FIG. 1 is a perspective view when a core wire part of a terminal-formed wire according to an embodiment of the present invention is divided.

FIG. 2 is a perspective view when bending process is performed on the core wire part of the terminal-formed wire according to the embodiment of the present invention.

DESCRIPTION OF EMBODIMENTS

Figure 3:
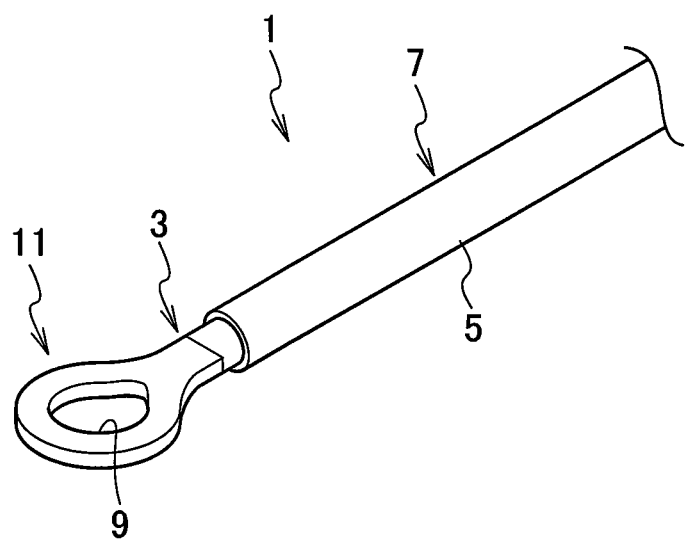
FIG. 3 is a perspective view when the core wire part of the terminal-formed wire according to the embodiment of the present invention has been terminal-formed.

With reference to FIG. 1 to FIG. 3, a terminal-formed wire and a manufacturing method thereof according to an embodiment of the present invention will be described.

As illustrated in FIG. 2, a terminal-formed wire 1 according to the embodiment includes a covered wire 7 obtained by covering an outer circumference of a core wire part 3 including a plurality of element wires with a covering part 5, and a terminal part 11 provided at a terminal of the covered wire 7 and terminal-formed with the core wire part 3 exposed from the covering part 5 and with the core wire part 3 having a connection hole 9.

At the terminal part 11, the plurality of the element wires of the core wire part 3 is divided into two, and the leading ends of the divided plurality of the element wires 13, 15 are folded back toward the root parts in different directions from each other to form the connection hole 9.

A manufacturing method of a terminal-formed wire 1 includes a first process of removing a covering part 5 of a terminal of a covered wire 7 to expose a core wire part 3 including a plurality of element wires; a second process of dividing the plurality of element wires of the core wire part 3 into two; a third process of folding back leading edges of the divided plurality of element wires 13, 15 toward a root part in different directions from each other to form a connection hole 9; and a fourth process of forming a terminal part 11 by solidifying the core wire part 3 formed with the connection hole 9.

As illustrated in FIG. 1 to FIG. 3, the covered wire 7 includes the core wire part 3 and the covering part 5. The core wire part 3 includes the plurality of the element wires made of conductive material. The outer circumference of the core wire part 3 is covered with the covering part 5.

The covering part 5 is made of insulating material, and closely adheres to and covers the outer circumference of the core wire part 3, thereby insulating and covering the core wire part 3. By removing a part of the covering part 5 by a predetermined length at a terminal part, the core wire part 3 is exposed outside. The exposed core wire part 3 is used as the terminal part 11.

At the terminal part 11, the plurality of the element wires of the exposed core wire part 3 is divided into two, and the leading ends of the divided plurality of element wires 13, 15 are folded back toward the root part in the different directions from each other to form the connection hole 9.

More specifically, the plurality of element wires of the exposed core wire part 3 is divided into two, an upper side and a lower side. Of the divided plurality of element wires 13, 15, the leading ends of the plurality of element wires 13 positioned at an upper side, as indicated with an inside arrow illustrated in FIG. 2, are folded back toward the root part in a counter-clockwise direction. On the other hand, the leading ends of the plurality of element wires 15 positioned at a lower side as indicated with an outside arrow illustrated in FIG. 2, are folded back toward the root part in a clockwise direction. When the element wires 13, 15 are folded back, a folding part (core wire part 3 positioned around the connection hole 9) of the element wires is formed into a circle to easily form the connection hole 9.

The terminal part 11 formed by folding back the divided plurality of element wires 13, 15 is bonded by ultrasonic wave bonding or bonder at its root part side (core wire part 3 side adjacent to the covering part 5), and solidified by the bonder or pressing at its folding potion side (core wire part 3 side positioned around the connection hole 9), so as to be terminal-formed.

At such a terminal part 11, a fastening member (not illustrated) such as a bolt is inserted into the connection hole 9 with respect to a mating connection part (not illustrated) such as a mating terminal or a mating device, so as to electrically connect and fix the terminal part 11 and the mating connection part with each other. When the fastening member of the terminal part 11 is fastened, the tension force may be applied to the terminal part 11 along the length direction of the covered wire 7. However, since the connection hole 9 is formed by folding back the plurality of element wires 13, 15, the terminal part 11 is prevented from generating ripping or shearing. Further, since the plurality of element wires 13, 15 is folded back in the different directions from each other to cross each other, and bonded with each other or solidified all over the element wires 13, 15, the tension force is spread over an overall part where the element wires 13, 15 are bonded with each other and solidified. Therefore, the plurality of element wires 13, 15 is folded back in the different directions from each other to cross each other, thereby improving strength against the tension force.

The manufacturing method of the wire 1 will be described below. First, the covering part 5 of the terminal of the covered wire 7 is removed by the predetermined length to expose the core wire part 3 including the plurality of element wires. (First Process)

Next, the plurality of element wires of the core wire part 3 is divided into two, which are the plurality of element wires 13 at the upper side and the plurality of element wires 15 at the lower side. (Second Process)

Next, the leading ends of the divided plurality of element wires 13, 15 are folded back toward the root part in the different directions from each other to cross each other at a folding back part to form the connection hole 9. (Third Process)

The terminal part 11 at the root part side is bonded by the ultrasonic wave bonding or the bonder, and the terminal part 11 at the folding part side is solidified by the bonder or the pressing, thereby terminal-forming the core wire part 3 formed with the connection hole 9 to form the terminal part 11. (Fourth Process)

In such a terminal-formed wire 1, since the plurality of element wires of the core wire part 3 in the terminal part 11 is divided into two, the bending force of the core wire part 3 becomes smaller. Thus, the length of the core wire part 3 exposed from the covering part 5 does not need to be increased, thereby facilitating the bending process. In addition, the reactive force of the core wire part 3 after the bending process is also small, thereby facilitating maintaining the form of the wire before terminal formation.

Further, at the terminal part 11, since the connection hole 9 is formed by folding back the leading ends of the divided plurality of element wires 13, 15 toward the root part in the different directions from each other, the bending part of the divided plurality of element wires 13, 15 cross each other, thereby improving the strength against the tension force or the like.

Therefore, in such a terminal-formed wire 1, increase of the size of the terminal part 11 can be suppressed and the bending process on the core wire part 3 can be facilitated, thereby facilitating maintaining the form of the wire before terminal formation.

Further, since a connection method of the terminal-formed wire 1 includes a second process of dividing the plurality of element wires of the core wire part 3 into two, the bending force of the core wire part 3 becomes smaller. Therefore, the length of the core wire part 3 exposed from the covering part 5 does not need to be increased, thereby facilitating the bending process. In addition, the reactive force of the core wire part 3 after the bending process also becomes smaller, thereby facilitating maintaining the form of the wire before terminal formation.

Further, in the third process, since the connection hole 9 is formed by folding back the leading ends of the divided plurality of element wires 13, 15 toward the root part in the different directions from each other, the bending parts of the divided plurality of element wires 13, 15 cross each other, thereby improving the strength against the tension force.

Therefore, the manufacturing method of such a terminal-formed wire 1 can suppress increase of the size of the terminal part 11, and facilitate the bending process of the core wire part 3, thereby facilitating maintaining the form of the wire before terminal formation.

In the terminal-formed wire according to the embodiment of the present invention, the terminal part at the root part side is bonded by the ultrasonic bonding or the bonder, but, not to limit to those described above, a bonding tool may be used to bond the terminal part at the root part side with one another.

This application is based upon and claims the benefit of priority of the prior Japanese Patent Application 2012-202196, filed on Sep. 14, 2012, the entire content of which is incorporated herein by reference.

INDUSTRIAL APPLICABILITY

According to the present invention, effects can be obtained for providing the terminal-formed wire capable of reducing the size of the terminal part, facilitating the bending process on the core wire part, and facilitating maintaining the form of the wire before terminal formation, and a manufacturing method of the terminal-formed wire.

REFERENCE SIGNS LIST 1 terminal-formed wire
3 core wire part 5 covering part
7 covered wire
9 connection hole
11 terminal part
13, 15 divided plurality of element wires

The invention claimed is:

1. A terminal-formed wire, comprising:
a covered wire obtained by covering an outer circumference of a core wire part including a plurality of element wires with a covering part; and
a terminal part provided at a terminal of the covered wire and terminal-formed with the core wire part exposed from the covering part and with the core wire part having a connection hole,
wherein, at the terminal part, the plurality of element wires of the core wire part is divided into two; and
wherein leading ends of the divided plurality of the element wires are folded back toward a root part in different directions and to overlap from each other to form the connection hole.

2. The terminal-formed wire of claim 1, wherein the covering part is made of insulating material that closely adheres to and covers the outer circumference of the core wire part thereby insulating and covering the core wire part.

3. The terminal-formed wire of claim 1, wherein the covering part comprises a removed part having a predetermined length at the terminal part thereby forming the core wire part exposed from the covering part.

4. The terminal-formed wire of claim 1, wherein the plurality of element wires of the exposed core wire part is divided into an upper side and a lower side.

5. The terminal-formed wire of claim 4, wherein
the leading ends of the plurality of element wires positioned at the upper side are folded back toward the root part in a counter-clockwise direction, and
the leading ends of the plurality of element wires positioned at the lower side are folded back toward the root part in a clockwise direction.

6. The terminal-formed wire of claim 5, wherein the leading ends of the element wires positioned at the upper side and the lower side are folded back such that a folding part of the element wires is formed into a circle to form the connection hole.

7. The terminal-formed wire of claim 1, wherein the terminal part including the leading ends of the divided plurality of the element wires that are folded back toward a root part in different directions from each other comprises a bonded part that is bonded by ultrasonic wave bonding or bonder and solidified at a root part side.

8. The terminal-formed wire of claim 1, wherein the terminal part including the leading ends of the divided plurality of the element wires that are folded back toward a root part in different directions from each other comprises a bonded part that is pressed at a folding portion side so as to be terminal-formed.

9. The terminal-formed wire of claim 1, wherein the leading ends of the divided plurality of the element wires are folded back toward a root part in different directions from each other to cross each other and are bonded with each other or solidified such that a tension force is spread.

10. A manufacturing method of a terminal-formed wire, comprising:
a first process of removing a covering part of a terminal of a covered wire to expose a core wire part including a plurality of element wires;
a second process of dividing the plurality of element wires of the core wire part into two;
a third process of folding back leading edges of the divided plurality of element wires toward a root part in different directions and to overlap from each other to form a connection hole; and
a fourth process of forming a terminal part by solidifying the core wire part formed with the connection hole.

11. The manufacturing method of the terminal-formed wire of claim 2, wherein the first process further comprises removing a covering part of a terminal of a covered wire by a predetermined length to expose the core wire part including the plurality of element wires.

12. The manufacturing method of the terminal-formed wire of claim 10, wherein the second process further comprises dividing the plurality of element wires of the core wire part into a plurality of element wires at an upper side and a plurality of element wires at a lower side.

13. The manufacturing method of the terminal-formed wire of claim 10, wherein the third process further comprises folding back the leading edges of the divided plurality of element wires toward the root part in different directions from each other to cross each other at a folding back portion to form the connection hole.

14. The manufacturing method of the terminal-formed wire of claim 10, wherein the fourth process further comprises solidifying the core wire part formed with the connection hole by the ultrasonic wave bonding.

15. The manufacturing method of the terminal-formed wire of claim 10, wherein the fourth process further comprises solidifying the core wire part formed with the connection hole by pressing.

16. The manufacturing method of the terminal-formed wire of claim 10, wherein the fourth process further comprises solidifying the core wire part formed with the connection hole by a bonder.

17. The manufacturing method of the terminal-formed wire of claim 10, wherein the fourth process further comprises solidifying the core wire part formed with the connection hole by a bonding tool.

* * * * *